United States Patent Office

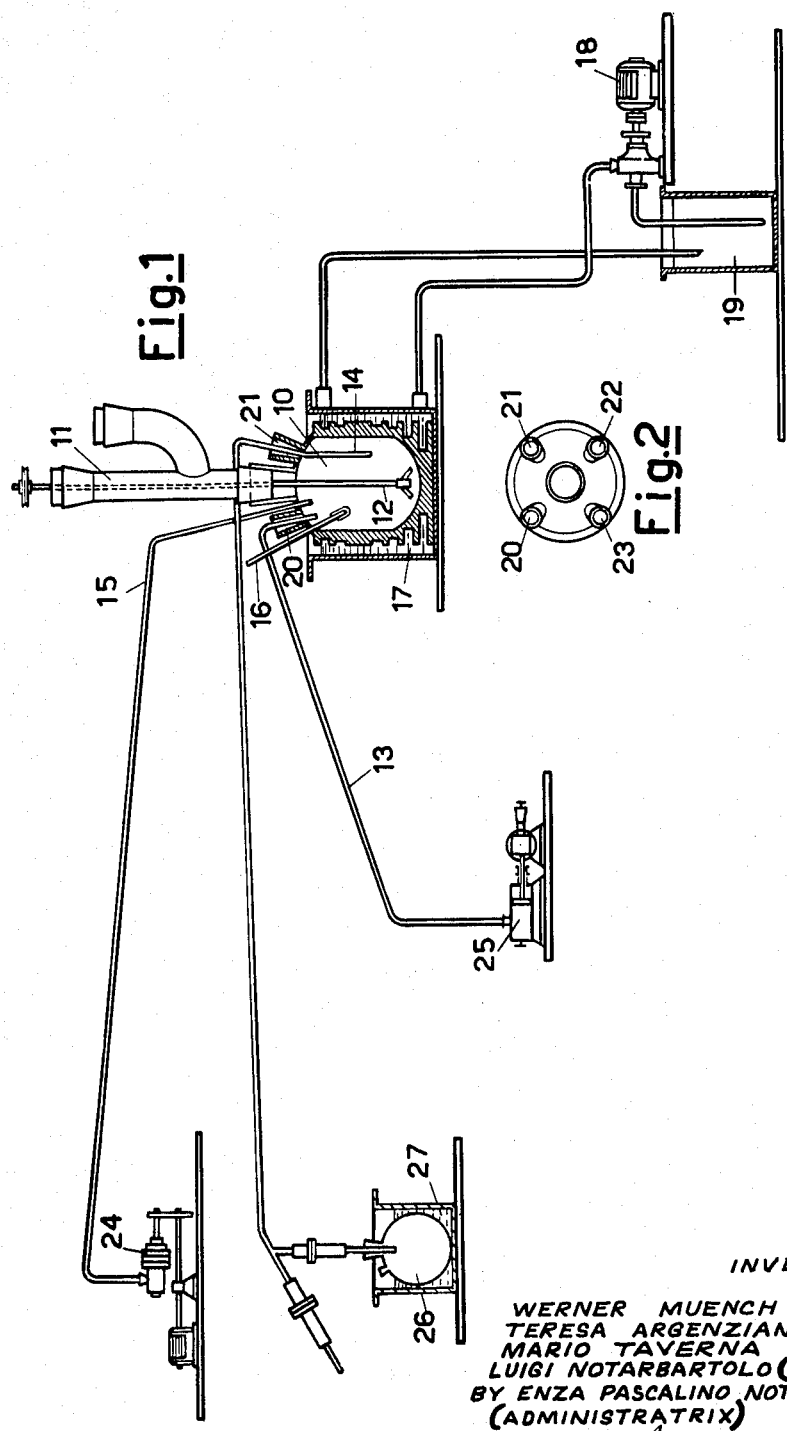

3,257,171
Patented June 21, 1966

3,257,171
APPARATUS FOR THE CONTINUOUS PREPARATION OF CAPROLACTAM
Werner Muench, Cesano Maderno, Teresa Argenziano and Mario Taverna, Milan, Italy, and Luigi Notarbartolo, deceased, late of Milan, Italy, by Enza Pascalino Notarbartolo, administratrix, Milan, Italy, and Paola Notarbartolo, heir, Milan, Italy, assignors to Snia Viscosa Societa Nazionale Industria Applicazioni Viscosa S.p.A., Milan, Italy, a company of Italy
Original application Nov. 2, 1962, Ser. No. 235,161, now Patent No. 3,167,543, dated Jan. 26, 1965. Divided and this application Dec. 26, 1963, Ser. No. 333,762
Claims priority, application Italy, Nov. 22, 1961, 21,025/61, Patent 659,858
1 Claim. (Cl. 23—260)

The present application relates to the preparation of caprolactam, and is a division of our copending application, Serial No. 235,161, filed November 2, 1962, now U.S. Patent No. 3,167,543. More particularly, this application is directed to apparatus for manufacturing caprolactam by the process claimed in said copending application.

In Patent No. 3,022,291 previously granted applicants a general method was described for the preparation of caprolactam by nitrosation of cyclohexyl compounds having a tertiary carbon atom, in particular of hexahydrobenzoic acid and its functional derivatives, cyclohexyl aryl ketones, dicyclohexyl ketone, etc.

One object of the present invention is to provide improved apparatus for performing the general method described in the aforesaid patent.

Another object of the invention is to provide apparatus for carrying out a continuous process for the preparation of caprolactam.

Another object is to provide apparatus for producing crude caprolactam in high yield and good purity.

Other objects and advantages of the invention will appear hereinafter from the specification and from the recital of the appended claims, particularly when read in conjunction with the accompanying drawings.

According to the invention, nitrosation is initially carried out, in the presence of oleum containing 23 to 60% of free sulfur trioxide, at a temperature of about 90 to 100° C. and preferably at about 100° C., with the time of residence of the reaction mixture in the nitrosation zones, i.e., in the reactor (or set of reactors) between 1 and 15 minutes, preferably between 4 and 6 minutes. By free $SO_3$ is meant the $SO_3$ present in the composition regardless of whether it is there as such, or bound to sulfuric acid (pyrosulfuric acid), or to nitrosylsulfuric acid (nitrosylsulfuric anhydride).

In view of the strongly exothermic nature of the nitrosation reaction with these compounds (hereinafter, the reaction will also be referred to as "lactamization") it is necessary to provide means for cooling the reaction mass.

Preferably, the nitrosation vessel is continuously charged with a solution of hexahydrobenzoic acid or another starting material in oleum, this solution having been previously prepared in order to dissipate the heat of solution outside the nitrosation zone. Since, in the latter case, nitrosation continues also in the cooler, the cooler, too, is a part of the nitrosation zone, and the residence time includes residence in the cooler.

The initial molar ratio of hexahydrobenzoic acid to the nitrosation agent, calculated as NO, is preferably kept between 1.8 and 2.2, i.e., an excess of the former is used. The molar ratio of free sulfur trioxide to nitrosation agent, expressed as above, is kept between 0.4 and 1.2, preferably between 0.65 and 0.85. These ratios are based on flow rates per unit time for the different reagents under steady-state conditions.

Nitrosylsulfuric acid is the preferred nitrosation agent, but it may be substituted by other nitrosation agents, even if formed in situ.

Two different embodiments of apparatus built according to the invention for practicing the process of the invention are illustrated in the accompanying drawings, wherein:

FIG. 1 is a diagrammatic side elevation, partly in section of apparatus built according to one embodiment of the invention;

FIG. 2 is a section taken on the line 2—2 of FIG. 1 looking in the direction of the arrows.

Figure 3:
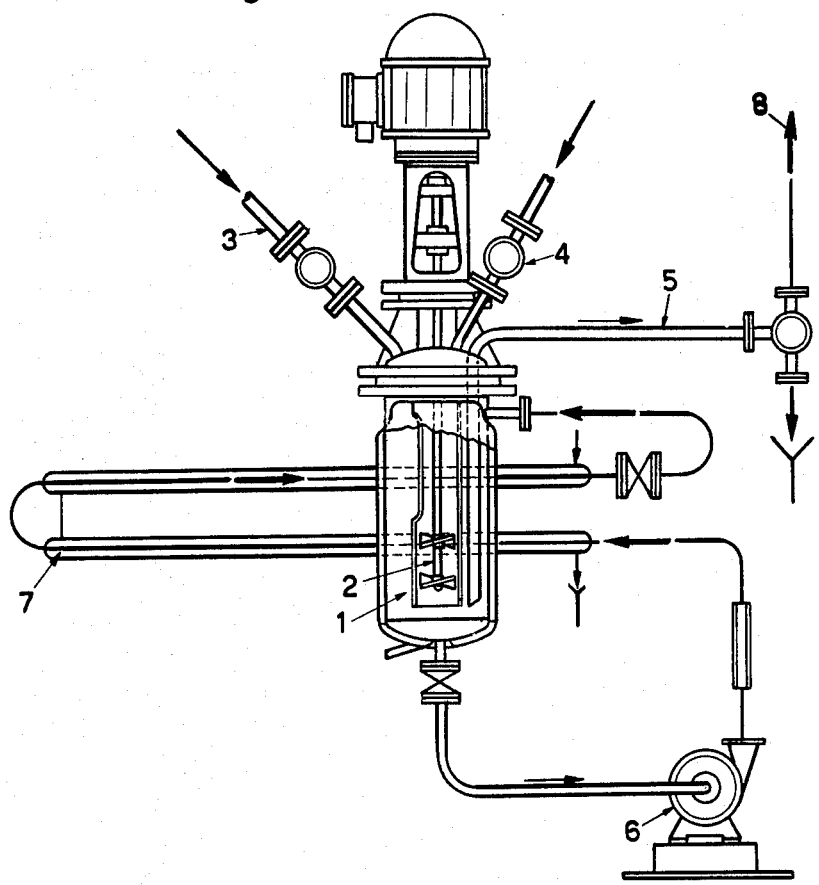
FIG. 3 is a side elevation, partly broken away, of apparatus built according to another embodiment of the invention.

Referring now to the drawings by numerals of reference, in FIG. 1 10 indicates a steel reactor, externally fitted with cooling fins, which in the present example has a capacity of 900 cc. It is fitted with a separate centrally-disposed neck 11, which receives the shaft of an agitator 12, and with four additional necks (20, 21, 22, 23) of which only the first two can been seen in FIG. 1, but of which all are shown in FIG. 2. The four necks 20, 21, 22, 23 receive, respectively, a nitrosylsulfuric acid charging tube 13, a dip leg 14 for discharging the reaction product, a tube 15 for charging hexahydrobenzoic acid and oleum, and a thermometer 16. The reactor is immersed in a coolant, for example, an oil bath 17. Pump 18 circulates the oil from an oil tank 19. 24 and 25 indicate pumps, a gear pump and a piston pump, respectively, which respectively feed the hexahydrobenzoic acid-oleum mixture and the nitrosylsulfuric acid to the reactor. 26 indicates a receiver for the reaction product, which is cooled with an ice water bath 27, and from which the product and $CO_2$, which is partially emulsified with the reaction mass, are continuously discharged (see drawing).

With this apparatus, it is possible to regulate the quantity of product which always remains in the reactor, and thus the residence time, by adjusting the distance of dip leg 14 from the bottom of the reactor.

A mixture of hexahydrobenzoic acid and oleum containing say 40% of free sulfur trioxide is prepared separately by slowly adding the oleum to molten hexahydrobenzoic acid, with agitation and external cooling with ice and salt. The internal temperature must not exceed 40° C. The weight ratio of hexahydrobenzoic acid to oleum in the solution also depends on the composition of the nitrosylsulfuric acid solution.

The solution of nitrosylsulfuric acid in sulfuric acid is prepared separately, for example by absorption of $N_2O_3$ in 22% oleum; the final solution may contain, for example, 43% of $NOHSO_4$, 1.5% of free $SO_3$, and 2.4% of $HNO_3$.

The initial reactor charge is formed by fixing the temperature of bath 17 at say 75° C., placing in reactor 10, for example, 73.2 g. of the hexahydrobenzoic acid-oleum solution and feeding, for example, 60 g. of nitrosylsulfuric acid solution at such a rate that, at a constant temperature of bath 17, the internal temperature gradually increases to 95 to 98° C. At this point, continuous operation is begun.

Simultaneously, say 738 g./hr. of hexahydrobenzoic acid-oleum solution and say 601 g./hr. of nitrosylsulfuric acid solution are fed to the reactor, the bath temperature being kept at say 50 to 60° C. Initially the internal temperature then rises to 100° C., but in a few minutes levels off at 95° C. From the start of continuous operation, the reaction product is discharged regularly through dip leg 14 because of the slight pressure caused by carbon dioxide formed during lactamization.

The reaction product may be continuously treated according to the following method. The parts of reagent are by weight and refer to 100 parts of acid solution discharged from reactor 10.

The mass leaving the reactor is continuously removed from the container in which it was collected, in this case flask 27, and is hydrolyzed by addition of say 100 parts of acid solution and say 200 parts of ice. The hydrolyzed mass is then extracted with say 300 parts of cyclohexane. Cyclohexane extracts from the mass the excess of unreacted hexahydrobenzoic acid; the cyclohexane solution is easily separated from the aqueous, acidic caprolactam solution by decantation. The extraction may be carried out by means of any suitable apparatus, for example in a separatory funnel. Extraction could be effected simultaneously with hydrolysis, by feeding together water and cyclohexane.

The acidic solution is then neutralized, for example with gaseous ammonia, until a pH of say 7-7.5 is reached. Caprolactam is obtained by counter-current extraction of the neutralized solution with say 280 parts of methylene chloride. The extraction may be performed in any suitable apparatus.

Distillation of methylene chloride yields crude caprolactam of 95 to 98% strength. The ammonium sulfate solution obtained contains small amounts of methylene chloride and various by-products.

The method described in the foregoing example gives a caprolactam yield (calculated as pure caprolactam) of 86 to 87%, based on hexahydrobenzoic acid and 80.4% based on nitrosylsulfuric acid.

In the apparatus shown in FIG. 3, 1 indicates a jacketed steel reactor; 2 is an agitator; 3 and 4 are tubes for charging the two reagents, i.e, hexahydrobenzoic acid and nitrosylsulfuric acid; 5 is a dip leg for discharging the reaction product; and 6 is a pump for recycling the reaction product through heat-exchanger 7.

In this case, the solution of hexahydrobenzoic acid in oleum is prepared as follows:

A nitrosylsulfuric acid solution, having the composition, for example, $NOHSO_4$:57.5%;

$$H_2SO_4(100\%):41.5\%$$

free $SO_3$:1%, is prepared separately.

Fresh hexahydrobenzoic acid and a solution of hexahydrobenzoic acid in cyclohexane, obtained by extraction with cyclohexane of the hydrolyzed reaction mixture as described above are taken from suitable storage tanks and are also separately mixed. The resulting solution of hexahydrobenzoic acid in cyclohexane is treated with say 30% oleum in an extractor consisting of a cooled vessel. In this manner, oleum extracts hexahydrobenzoic acid from the cyclohexane solution, and by cooling the vessel, the heat of solution of hexahydrobenzoic acid in oleum is absorbed. Cyclohexane is separated to be reused in the next extraction of caprolactam, as described above. During the operation, the temperature must not exceed 30° C.

In one quantitative experiment, 4.7 kg./hr. of hexahydrobenzoic acid and a solution of 4.8 kg./hr. of the same acid in 20 kg./hr. of cyclohexane are mixed. Extraction is effected with 6.2 kg./hr. of 30% oleum. All of the cyclohexane is discharged from the extractor to be reused in the extraction of caprolactam, while the solution of 9.5 kg./hr. of hexahydrobenzoic acid in oleum is fed to the reactor; 8.2 kg./hr. of nitrosylsulfuric acid is also fed to the reactor.

Cooling is accomplished by circulating the reaction mixture through the heat exchanger 7 so that the temperature in the reactor does not exceed 100° C. and is preferably maintained between 95 and 100° C. The carbon dioxide formed in the reaction (1.6 kg./hr.) is discharged into the atmosphere through the tube 8. The solution, which is continuously discharged from the reactor, contains 4.8 kg./hr. of unreacted hexahydrobenzoic acid, 3.9 kg./hr. of caprolactam, 0.4 kg./hr. of reaction by-products and 13.2 kg./hr. of sulfuric acid. This solution is treated as described in the preceding example, i.e., it is neutralized, the unreacted hexahydrobenzoic acid is extracted with cyclohexane, and the remaining acid caprolactam solution is neutralized and extracted.

For the extraction, 20 kg./hr. of cyclohexane is used, corresponding to the amount discharged from the extractor in which the solution of hexahydrobenzoic acid in oleum was prepared. The hexahydrobenzoic acid solution in cyclohexane is recycled and reused in the mixer as specified above. The yield of pure caprolactam is 94% on hexahydrobenzoic acid and 93% based on nitrosylsulfuric acid.

Obviously different proportions of the reactants may be employed, as described in our parent application, Serial No. 235,161; and modifications may be made in the apparatus. For instance, an additional gear pump may be used in the apparatus of FIGS. 1 and 2 to pump cyclohexane into tube 15, through which, together with the hexahydrobenzoic acid-oleum solution, it enters the reactor.

While the invention has been described in connection with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claim.

Having thus described our invention, what we claim is:

Apparatus for preparation of caprolactam by nitrosation of cyclohexyl compounds having a tertiary carbon atom, comprising (a) a reaction vessel,
(b) an agitator rotatably mounted in said vessel,
(c) two separate tubes mounted to communicate, each, with said vessel and through which the reagents may be charged into said vessel,
(d) means for subtracting heat from said vessel,
(e) means for continuously charging said vessel through said tubes,
(f) means for discharging the reaction product from said vessel including a third, elongate tube which communicates with said reaction vessel at a point below the points of communication of the first two named tubes with the reaction vessel, and which is adjustable in said reaction vessel to adjust its distance from the bottom of the reaction vessel,
(g) a receiver vessel for receiving the reaction product from said third tube, said receiver vessel being remotely spaced from said reaction vessel, and
(h) means for cooling said receiver vessel,
(i) said vessels and said third tube together constituting the nitrosating zone of the apparatus.

References Cited by the Examiner

UNITED STATES PATENTS 2,487,246 11/1949 Johnson et al. _____ 260—239.3
2,663,699 12/1953 Bloem et al. _____ 23—260 X MORRIS O. WOLK, Primary Examiner.

JAMES H. TAYMAN, Jr., Examiner.